United States Patent
Gifford et al.

(10) Patent No.: US 10,606,245 B2
(45) Date of Patent: Mar. 31, 2020

(54) PARTS MATCHING FOR IMPROVED MANUFACTURING ASSEMBLY

(71) Applicant: INTERNATIONAL BUSINESS MACHINES CORPORATION, Armonk, NY (US)

(72) Inventors: David J. Gifford, Germantown, NY (US); Feng Xue, Singapore (SG)

(73) Assignee: International Business Machines Corporation, Armonk, NY (US)

(*) Notice: Subject to any disclaimer, the term of this patent is extended or adjusted under 35 U.S.C. 154(b) by 179 days.

(21) Appl. No.: 15/823,096

(22) Filed: Nov. 27, 2017

(65) Prior Publication Data

US 2019/0163169 A1    May 30, 2019

(51) Int. Cl.
- *G05B 19/418* (2006.01)
- *G06Q 10/06* (2012.01)
- *G06Q 10/08* (2012.01)

(52) U.S. Cl.
CPC ... *G05B 19/4183* (2013.01); *G05B 19/41805* (2013.01); *G05B 19/41865* (2013.01); *G06Q 10/06312* (2013.01); *G06Q 10/0875* (2013.01); *G05B 2219/31036* (2013.01)

(58) Field of Classification Search
CPC .......... G06Q 10/087; G06Q 10/06312; G05B 19/4183; G05B 19/41865; G05B 19/41805
See application file for complete search history.

(56) References Cited

U.S. PATENT DOCUMENTS

| | | |
|---|---|---|
| 3,914,842 A | 10/1975 | Bruckhoff et al. |
| 5,412,576 A | 5/1995 | Hansen |
| 6,480,756 B1 | 11/2002 | Luh et al. |
| 6,493,679 B1 | 12/2002 | Rappaport et al. |
| 6,631,305 B2 | 10/2003 | Newmark |
| 7,768,404 B2 | 8/2010 | Flores et al. |
| 8,700,497 B2 | 4/2014 | Gerber et al. |
| 8,949,149 B2 | 2/2015 | del Rosario et al. |
| 9,134,724 B2 | 9/2015 | Saulsbury et al. |

(Continued)

FOREIGN PATENT DOCUMENTS

EP    2399850 A1    12/2011

OTHER PUBLICATIONS

Becker et al, "A survey on problems and methods in generalized assembly line balancing", Elsevier, 2004, pp. 1-22.

*Primary Examiner* — Mohammad Ali
*Assistant Examiner* — Vincent W Chang
(74) *Attorney, Agent, or Firm* — Tihon Poltvets (57) ABSTRACT

A method includes receiving a training data set for a first plurality of assemblies, wherein the training data set includes a plurality of components for each of two or more types of components of the first plurality of assemblies. The method analyzes the training data set for the first plurality of assemblies. Responsive to receiving a set of product component information for a second plurality of assemblies, the method creates a graded product cluster template for the second plurality of assemblies based on the analyzed training data for the first plurality of assemblies. The method sends the graded product cluster template to an automated manufacturing device, wherein the automated manufacturing device manufactures a first assembly from the second plurality of assemblies based on the graded product cluster template.

17 Claims, 5 Drawing Sheets

(56) References Cited

U.S. PATENT DOCUMENTS

| | | |
|---|---|---|
| 2002/0138316 A1 | 9/2002 | Katz et al. |
| 2003/0233160 A1* | 12/2003 | Ishida .................... G06F 17/50 700/106 |
| 2004/0225390 A1 | 11/2004 | Keller et al. |
| 2005/0159973 A1 | 7/2005 | Krause et al. |
| 2006/0271228 A1 | 11/2006 | Lopez |
| 2007/0282913 A1 | 12/2007 | Hurtis et al. |
| 2008/0082427 A1 | 4/2008 | Gandhi et al. |
| 2011/0258087 A1 | 10/2011 | Ghosh et al. |
| 2013/0103533 A1* | 4/2013 | Prasad ................... G06Q 10/06 705/26.5 |
| 2014/0343997 A1 | 11/2014 | Brown et al. |
| 2015/0142154 A1 | 5/2015 | Tiano |

* cited by examiner

| | P1 | P2 | P3 | PCPA | PP1 Cpk | Cpk Rating | PP2 Cpk | Cpk Rating | Cpk Sum | Grade |
|---|---|---|---|---|---|---|---|---|---|---|
| Product S1 | P1-S1 | P2-S1 | P3-S1 | PCPA1 | 1.4 | 3 | 1.4 | 3 | 6 | G3 |
| Product S2 | P1-S2 | P2-S2 | P3-S2 | PCPA2 | 2.1 | 1 | 0.6 | 5 | 6 | G3 |
| Product S3 | P1-S3 | P2-S3 | P3-S3 | PCPA3 | 0.6 | 5 | 1.8 | 2 | 7 | G3 |
| Product S4 | P1-S4 | P2-S4 | P3-S4 | PCPA4 | 1.8 | 2 | 2.0 | 1 | 3 | G1 |
| Product S4 | P1-S5 | P2-S5 | P3-S5 | PCPA5 | 2 | 1 | 1.1 | 4 | 5 | G2 |
| Product S6 | P1-S6 | P2-S6 | P3-S6 | PCPA6 | 1.1 | 4 | 0.9 | 5 | 9 | G4 |

PARTS MATCHING FOR IMPROVED MANUFACTURING ASSEMBLY

FIELD OF INVENTION

This disclosure relates generally to manufacturing, and in particular to improving the quality of manufactured assemblies.

BACKGROUND OF THE INVENTION

In manufacturing settings, products being assembled typically consist of various components, where the various components can be sourced from multiple manufactures. Each component of a product being assembled is typically built to a list of standards, where the list of standards can include a set tolerances or performance measures for the components to ensure a level of quality for the final assembled product. The set of tolerances and performance measures allow for the multiple manufactures to produce components of varying degree of quality, while still meeting an appropriate level of quality standard. Instances can occur where multiple components compound tolerances that affect an overall quality or performance of the final assembled product, where each component is either on an upper or a lower limit of an allowable tolerance.

SUMMARY

Embodiments in accordance with the present invention disclose a method, computer program product and computer system for parts to assembly matching in a manufacturing setting, the method, computer program product and computer system can receive a training data set for a first plurality of assemblies, wherein the training data set includes a plurality of components for each of two or more types of components of the first plurality of assemblies. The method, computer program product and computer system can analyze the training data set for the first plurality of assemblies. Responsive to receiving a set of product component information for a second plurality of assemblies, the method, computer program product and computer system can create a graded product cluster template for the second plurality of assemblies based on the analyzed training data for the first plurality of assemblies. The method, computer program product and computer system send, by one or more processors, the graded product cluster template to an automated manufacturing device, wherein the automated manufacturing device manufactures a first assembly from the second plurality of assemblies based on the graded product cluster template.

DETAILED DESCRIPTION

Embodiments of the present invention allow for parts matching to assemble a highest-grade of product based on performance measures for each part, where the highest-grade of product is defined as a product with a smallest amount of tolerance variations and a greatest possible value for each performance measure. A parts processing engine can utilize a product cluster template based on a training data set to process large sets of parts information that can include part serial numbers and part characteristics, where part characteristics that can include performance measures, dimensions, and deviations from defined dimensions (i.e., tolerances). By processing large amounts of parts information, embodiments of the present invention can match parts prior to assembly to create a product of the highest-grade given a finite amount of parts available. The parts processing engine can update the product cluster template with each iteration of parts matching that occurs.

Figure 1:
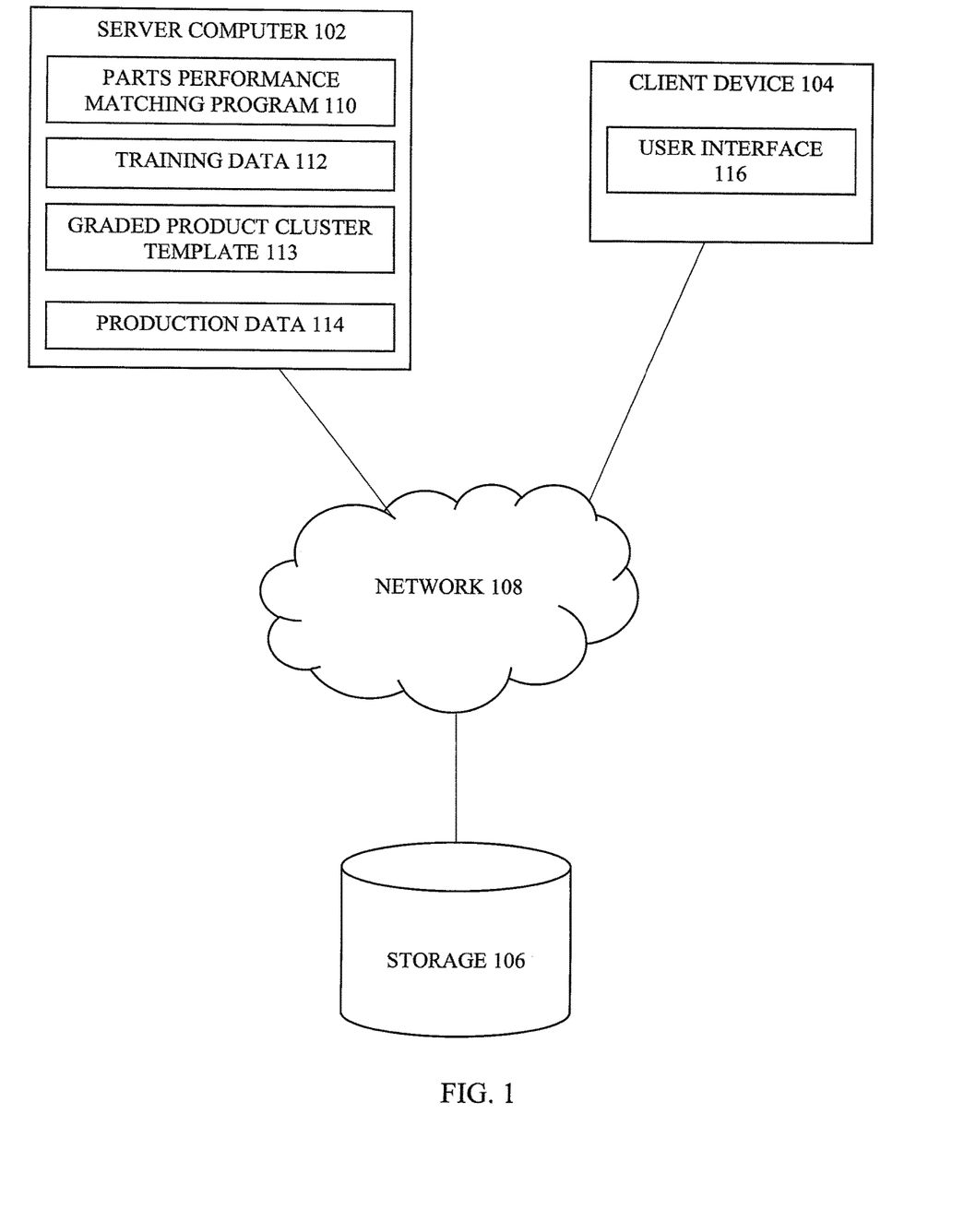
FIG. 1 is a functional block diagram illustrating a distributed data processing environment, in accordance with an embodiment of the present invention.

FIG. 1 is a functional block diagram illustrating a distributed data processing environment, in accordance with one embodiment of the present invention. The distributed data processing environment includes server computer 102, client device 104, and storage 106 all interconnected over network 108.

Server computer 102 may be a desktop computer, a laptop computer, a tablet computer, a specialized computer server, a smartphone, or any computer system capable of executing the various embodiments of parts performance matching program 110. In certain embodiments, server computer 102 represents a computer system utilizing clustered computers and components that act as a single pool of seamless resources when accessed through network 108, as is common in data centers and with cloud computing applications. In general, server computer 102 is representative of any programmable electronic device or combination of programmable electronic devices capable of executing machine-readable program instructions and communicating with other computer devices via a network. In this embodiment, server computer 102 has the ability to communicate with other computer devices to query the computer devices for information. Server computer 102 includes parts performance matching program 110, training data 112, graded product cluster template 113, and production data 114.

Client device 104 may be a laptop computer, tablet computer, netbook computer, personal computer (PC), personal digital assistant (PDA), smart phone, or wearable device (e.g., smart watch). Client device 104 includes user interface 116 and may include a client side parts performance matching program 110, not illustrated in FIG. 1. In general, client device 104 is representative of any programmable electronic device or combination of programmable electronic devices capable of executing machine-readable program instructions and communicating with users of other electronic devices via network 108. Client device 104 may include components, as depicted and described in further detail with respect to FIG. 5, in accordance with embodiments of the present invention.

Storage 106 represents a database for organizing and storing production parts information for every component (i.e., part) awaiting selection for assembly. The production parts information includes but is not limited to component serial numbers, component production dates, component production locations, component performance measures, component performance tolerances, component dimensions, and component dimension tolerances.

Parts performance matching program 110 provides real-time scalable analytic modeling method to analyze bill of material components and/or sub-assemblies in inventories to train, identify, group, and retrain over a specified time to produce the best fit of parts for an individual unit of product being assembled in a manufacturing setting. Parts performance matching program 110 can receive training data 112 for a specific set of assemblies to create graded product cluster template 113 utilized by a Real-time Parts Clustering (RPPM) engine. Parts performance matching program 110 can analyze training data 112 for the specific set of assemblies and create a base engine (RPPM engine) from a product cluster template for processing production parts information for future assemblies. Parts performance matching program 110 can receive a set of production parts information and create graded product cluster template 113 based on the received set of production parts information utilizing the base engine. Parts performance matching program 110 can update the base engine based on the received set of production parts information if required and send graded product cluster template 113 to automated manufacturing equipment, where the automated manufacturing equipment can create assembles based on graded product cluster template 113. Parts performance matching program 110 stores the production data set after the product assembly for future utilization.

In general, network 108 can be any combination of connections and protocols that will support communications between server computer 102, client device 104, and storage 106. Network 108 can include, for example, a local area network (LAN), a wide area network (WAN), such as the internet, a cellular network, or any combination of the preceding, and can further include wired, wireless, and/or fiber optic connections. In one embodiment, parts matching program 110 can be a web service accessible via network 108 to a user of client device 104. In another embodiment, parts performance matching program 110 may be operated directly by a user of server computer 102.

Client device 104 also includes user interface (UI) 116 and various programs (not shown). Examples of the various programs on client device 104 include: a web browser, an e-mail client, security software (e.g., a firewall program, a geo-locating program, an encryption program, etc.), an instant messaging (IM) application (app), and a communication (e.g., phone) application. In an example, a user of client device 104 can interact with user interface 116, such as a touch screen (e.g., display) that performs both input to a graphical user interface (GUI) and as an output device (e.g., a display) presenting a plurality of icons associated with software applications or images depicting the executing software application. Optionally, a software application (e.g., a web browser) can generate user interface 116 operating within the GUI of client device 104. User interface 116 accepts input from a plurality of input/output (I/O) devices including, but not limited to, a tactile sensor interface (e.g., a touch screen, a touchpad) referred to as a multi-touch display. An I/O device interfacing with user interface 116 may be connected to client device 104, which may operate utilizing wired (e.g., USB port) or wireless network communications (e.g., infrared, NFC, etc.).

Figure 2:
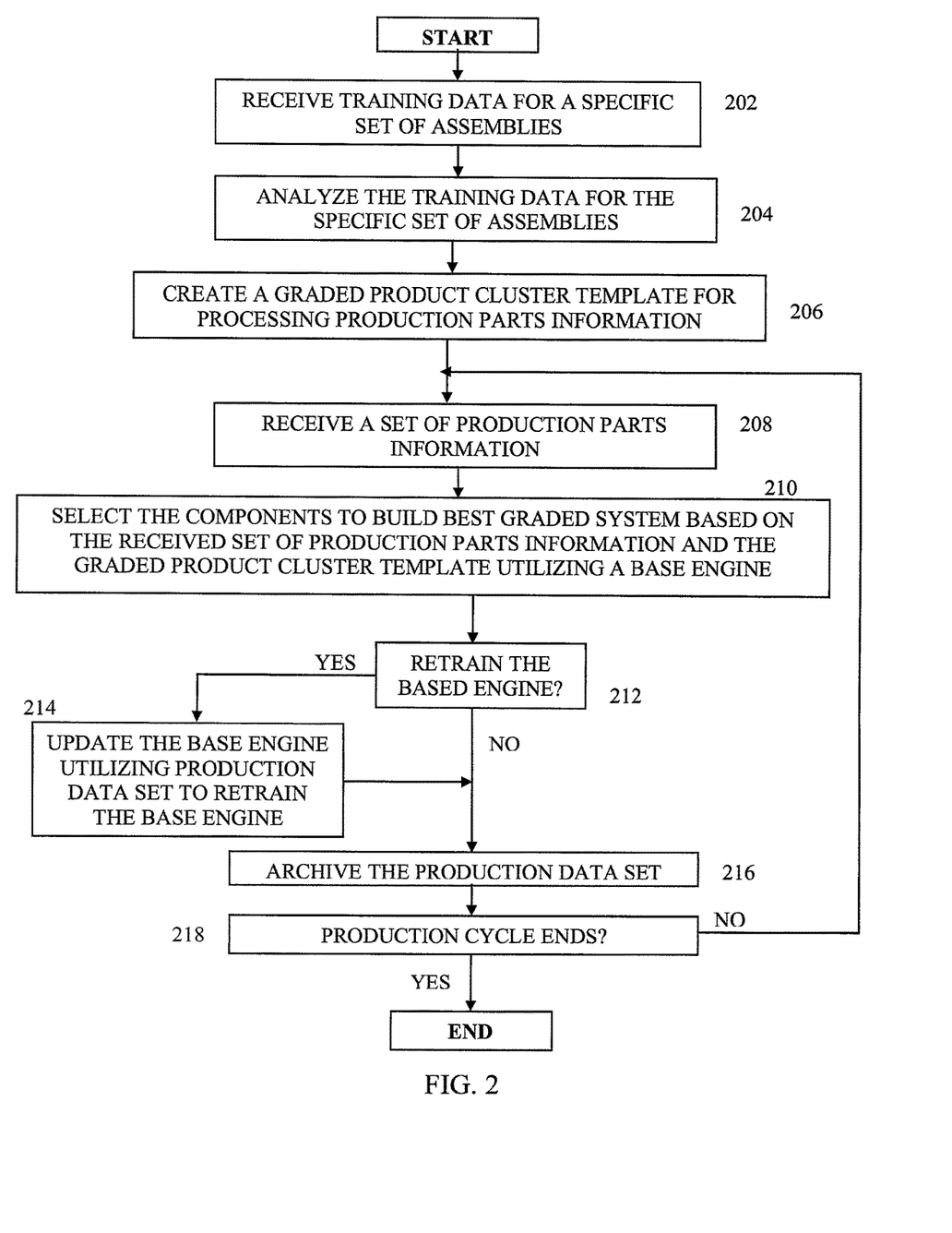
FIG. 2 is a flowchart depicting operational steps of a parts performance matching program for component selection in a manufacturing setting, in accordance with an embodiment of the present invention.

FIG. 2 is a flowchart depicting operational steps of a parts performance matching program for component selection in a manufacturing setting, in accordance with an embodiment of the present invention.

Part performance matching program 110 receives training data for a specific set of assemblies (202). Part performance matching program 110 is configured for a manufacturing setting, where a product is being assembled utilizing multiple components. Part performance matching program 110 is initially trained in order to create a base engine for processing production parts information for the product being assembled in the manufacturing setting. Part performance matching program 110 receives training data for a specific set of assemblies, where the training data includes historic data for the specific set of assemblies. For discussion purposes, the training data includes an M amount of assemblies (i.e., products), where each assembly (i.e., product) includes an N amount of parts. Each of M amount of assemblies and each of N amount of parts include a unique identification number (e.g., serial number), parametric test data, characterization test data, and other defined Part Attribute (PA) data or Product Performance Indicator (PPI) data.

The N amount of parts of the training data further includes a list of N amount of part numbers for assembling a single product, where the list of N amount of part numbers are designated $(P_1, P_2, P_3, \ldots, P_N)$. In one embodiment, a single product is a tablet computer and the list of N amount of parts are utilized for assembling the tablet computer. For example, $P_1$ is a first part number representing a motherboard, $P_2$ is a second part number representing a battery, and $P_N$ is a final part number representing front enclosure, for assembling the tablet computer. In this embodiment, since there are M amount of assemblies, there is an M amount of each of the N amount of part numbers $(P_1, P_2, P_3, \ldots, P_N)$. For example, if there are 100 assemblies and each assembly is built by 3 part numbers, where there are 100 items for each of the 3 part numbers $(P_1, P_2, P_3)$.

A single product's performance is characterized by a set of parameters referred to as Product Performance Indicators (PPI), where each of the M amount of assemblies (i.e., products) has a set of Product Performance Indicators are designated $(PPI_1, PPI_2, PPI_3, \ldots, PPI_P)$. Product performance Indicators represent a performance measure for a product, for example, $PPI_1$ is computational speed and $PPI_2$ is the power consumption for a server computer. Product Performance Indicators vary according to the product being produced and act as performance measures for the product. A single part is characterized by a set of parameters referred to as Parts Attributes (PA). For example, part number $P_1$ has a set of Parts Attributes $(PA_1)$ and part number $P_2$ has a set of Parts Attributes $(PA_2)$. Parts Attributes represent performance measures and/or specifications for a part (i.e., component). For example, a performance measure of a part can include a manufacturer verified clock speed for a central processing unit (CPU) and a specification attribute can include measurements for packaging the part in the product.

Part performance matching program 110 analyzes the training data for the specific set of assemblies (204). In this embodiment, part performance matching program 110 analyzes the training data for the specific set of assemblies by initially clustering similar parts based on Parts Attributes. For example, $P_1$ is a first part representing a drill bit, where the training data includes M amount of assemblies (i.e., products) and M amount of the first part $P_1$. Parts performance matching program 110 utilizes a clustering algorithm to the first part $P_1$ to establish a parts clustering model based on Part Attributes for M amount of the first part $P_1$. Parts performance matching program 110 can cluster M amount of the first part $P_1$ into one or more groups depending on the specific part attribute that parts performance matching program 110 evaluates. In the example above, $P_1$ is a first part representing a drill bit and parts performance matching program 110 clusters M amount of $P_1$ based on a measured thickness of the drill bit, where the measured thickness of the drill bit represents a part attribute. The first cluster can include drill bits measuring 4 mm-4.05 mm and the second cluster can include drill bits measuring >4.05 mm-4.099 mm. Part performance matching program 110 creates one or more clusters based on the parts attributes for each of the N amount of parts ($P_1$, $P_2$, $P_3$ . . . , $P_N$), where number of clusters for $P_n$ is denoted as $C_n$ Therefore, in the example above, $C_1=2$.

Subsequent to creating clusters, part performance matching program 110 determines the maximum amount of combination for the clusters of N amount of parts for producing M amount of assemblies (products). Part performance matching program 110 calculates the maximum amount of combination (c) for the clusters of N amount of parts by multiplying an amount of clusters for each part, across all N amount of parts ($c=C_1*C_2*$ . . . ) and part performance matching program 110 designates each combination as Product Cluster by Part Attribute ($PCPA_c$). For every PCPA, part performance matching program 110 assigns a final grade G though Product Performance Indicator (PPI) grading.

Part performance matching program 110 performs Performance Part Indicator grading by assigning a rating to each Product Clusters by Part Attribute, based on the value of the Performance Part Indicator value for each of the Product Clusters by Part Attribute. For example, a Performance Part Indicator is a process capability index $C_{pk}$ value for every unit in the Product Clusters by Part Attribute. Part performance matching program 110 can utilize a user defined rating system where, $C_{pk}$ rating=2 if $C_{pk}>=2$, $C_{pk}$ rating=2 if $2>C_{pk}>=1.66$, $C_{pk}$ rating=3 if $1.66>C_{pk}>=1.33$, $C_{pk}$ rating=4 if $1.33>C_{pk}>=1$, and $C_{pk}$ rating=5 if $1>C_{pk}$. For each $C_{pk}$ rating sum across multiple Product Performance Indicators, part performance matching program 110 assigns a final grade based on the sum of $C_{pk}$ ratings. For example, Grade G1=$C_{pk}$ sum is between P and 2P, Grade G2=$C_{pk}$ sum is between 2P and 3P, Grade G3=$C_{pk}$ SUM is between 3P and 4P, and Grade G4=$C_{pk}$ sum is between 4P and 5P.

Part performance matching program 110 creates a graded product cluster template for processing production parts information (206). In this embodiment, part performance matching program 110 creates a base engine, also referred to as a Real-time Parts Clustering (RPPM) engine, for processing production parts information for a manufacturing products. The RPPM engine is based on the analysis performed on the training data for the specific set of assemblies, where parts performance matching program 110 utilizes a product cluster template that includes individual Parts Performance Attributes ratings, combined Parts Performance Attributes ratings, and assigned final grading for clustering of production part for future assemblies. Part performance matching program 110 utilizes the RPPM engine to periodically cluster the parts for future assemblies depending on part utilization rate and when a new batch of parts are pulled from inventory.

Part performance matching program 110 receives a set of production parts information (208). In this embodiment, part performance matching program 110 receives a set of production parts information for an amount of parts to create Q amount of assemblies. Part performance matching program 110 selects parts to assembly a highest-grade (i.e., Grade G1) system possible based on the assigned final grading template of the RPPM engine (210). If part performance matching program 110 determines the receives set of production parts information cannot form the highest-grade or best graded system (i.e., Grade G1), part performance matching program 110 attempts to select parts to assembly a second highest-grade (e.g., Grade G2 or G3) system. Part performance matching program 110 attempts to select parts to assembly a highest-grade assembly in descending order of assigned final grades and part performance matching program 110 restarts with the highest-grade assembly for every set of production parts information is received.

Part performance matching program 110 selects the components to build a best graded system based on the received set of production parts information and the graded product cluster template utilizing the base engine (210). Part performance matching program 110 creates a production data through the production of the Q amount of assemblies.

Part performance matching program 110 determines whether to retrain the base engine (decision 212), for the assembly of next plurality of assemblies. In the event part performance matching program 110 determines to retrain the base engine, part performance matching program 110 updates the base engine by using the production data set (214). In the event part performance matching program 110 determines not to retrain the base engine, program 110 uses the current base engine and archives the production data from the Q amount of assemblies till next update (216)

Part performance matching program 110 updates the base engine (214). Part performance matching program 110 updates the base engine (i.e., RPPM engine) since Part Attributes (PA) and Product Performance Indicators (PPI) can change over time, which would result in the base engine becoming obsolete with the current parts clustering model and assigned final grading template. Instances where Part Attributes (PA) and Product Performance Indicators (PPI) can change over time include a change in a manufacturing process of an individual part that results in a change of specification for the part, a change in suppliers, and a performance upgrade of an individual part. Part performance matching program 110 utilizes the received set of production parts information and the latest created production data set to update the base engine with a new graded product cluster template. Part performance matching program 110 can utilize the new graded product cluster template can for the assembly of the next plurality of assemblies until the production cycle ends. Additionally, part performance matching program 110 can update the base engine to tighten specifications as Product Performance Indicators of assembled products improves over time.

Part performance matching program 110 archives the production data set (216). Parts performance matching program 110 archives the production data set in storage for utilization in a future cycle to determine whether the engine is required to be updated again.

Part performance matching program 110 determines whether the production cycle has ended (decision 218). In the event part performance matching program 110 determines the production cycle has not ended ("no" branch, decision 218), part performance matching program 110 reverts to receiving another set of production parts information (208). In the event part performance matching program 110 determines the production cycle has ended ("yes" branch, decision 218), part performance matching program 110 ceases operations.

In another embodiment, part performance matching program 110 sends the graded product cluster template to an automated manufacturing device, where the automated manufacturing device is an electronic part selection system capable of selecting a particular part out of a plurality of parts. The electronic part selection system can include part performance matching program 110, where through the graded product cluster template part performance matching program 110 instructs the electronic part selection system to select a particular part (e.g., $P_1$) from a specific cluster. The combination of creating a graded product cluster template utilizing the RPPM engine and implementing the graded product cluster template in an automated manufacturing setting allows for the automated manufacturing of the highest-grade of product.

An example of an automated manufacturing device includes a Surface Mount Technology (SMT) component placement system, also referred to as a pick-and-place machine. Part performance matching program 110 can cluster individual parts across multiple tape-and-reel feed mechanisms. For example, there are 10 tape-and-reel feed mechanisms that provide part $P_1$, where parts performance matching program 110 clusters part $P_1$ into 3 cluster. Cluster 1 includes tape-and-reel feed mechanisms 1 through 4, cluster 2 includes tape-and-reel feed mechanisms 4 through 7, and cluster 3 includes tape-and-reel feed mechanisms 8 through 10. Through the created graded product cluster template, part performance matching program 110 instructs pick-and-place machine from which cluster of tape-and-reel feed mechanisms to select part $P_1$.

Alternative embodiments include part performance matching program 110 deriving a product cluster template from engineering sample data during a product design phase instead of the utilizing training data from production. As a result, part performance matching program 110 can create a base engine (RPPM engine) for processing engineering parts information prior to a single product being assembled at a front end of a manufacturing cycle. A product is often designed utilizing industrial standard parts and customized parts. For industrial standard parts, part performance matching program 110 utilizes a parts clustered algorithm for the engineering samples and for the customized parts, part performance matching program 110 can design and manufacture engineering samples into pre-designed clusters in a controlled environment. Part performance matching program 110 can obtain the maximum amount of Product Cluster by Part Attribute ($c=C_1 * C_2 * \ldots$) by controlled experimentation in the design space of the product. Part performance matching program 110 can utilizes the method referenced above to determine Parts Performance Indicator (PPI) grading, parts clustering and matching for best performance based on an assigned final grading template. Periodic re-training would typically not be required unless a design change of at least one of the parts of the product occurs. The graded product cluster template that part performance matching program 110 creates can be utilized as feedback for next generation designs as a reference for areas (i.e., PPI) to improve.

Figure 3A:
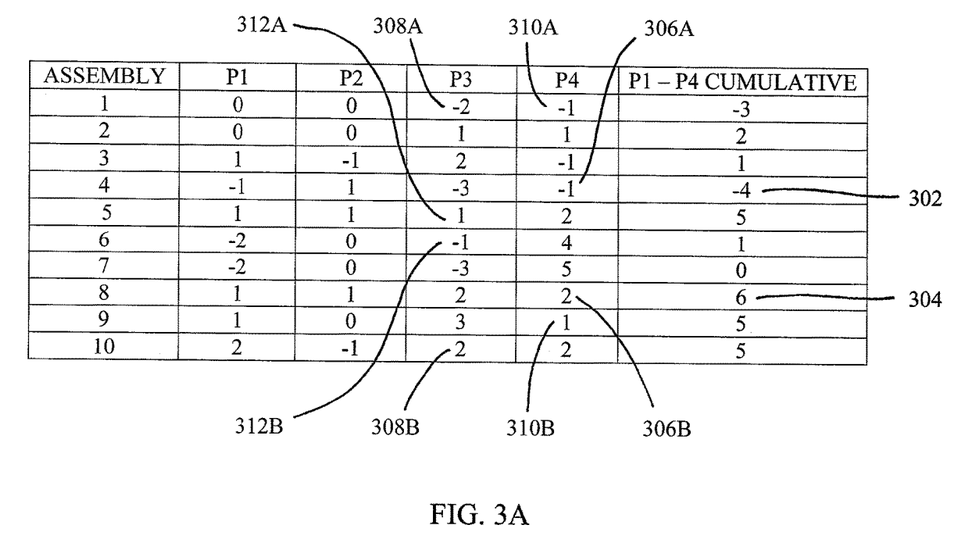
FIG. 3A is an example of a random selection of parts with a single Part Attribute (PA), in accordance with an embodiment of the present invention.

FIG. 3A is an example of a random selection of parts with a single Part Attribute (PA), in accordance with an embodiment of the present invention.

In this example, a set of production parts information includes 10 assemblies (units 1-10), where each of the 10 assemblies include 4 parts per assembly (P1, P2, P3, P4). Each part has a single Part Attribute (PA), resulting in 40 total Part Attributes for 40 total parts for the 10 assemblies. The Part Attribute for each part represents a nominal length+/− tolerance measured in mils. For the 10 parts (P1), the nominal length range is +2 mils and −2 mils. For the 10 parts (P2), the nominal length is +1 mils and −1 mils. For the 10 parts (P3), the nominal length is +3 mils and −3 mils. For the 10 parts (P4), the nominal length is +5 mils and −1 mils. As a result, the cumulative stack across (P1)-(P4) is Maximum +11 mil and Minimum −7 mil for a single assembly.

If an assembly of the 10 units was performed randomly, the resulting table represents the distribution of all 40 parts across all 10 assemblies. Column "P1-P4 Cumulative" represents the total tolerance (P1+P2+P3) for a single assembly out of the 10 total units. Minimum value 302 (−4 mil) represents a maximum value for tolerance in the negative direction and maximum value 304 (6 mil) represents a maximum value for tolerance in the positive direction across all 10 units. Part performance matching program 110 can receive a set of production parts information and virtually pre-assemble the 10 units utilizing an RPPM engine created through analysis of training data. In this example, part 306A (Assembly 4, P4) can swap with part 306B (Assembly 8, P4), part 308A (Assembly 1, P3) can swap with part 308B (Assembly 10, P3), part 310A (Assembly 1, P4) can swap with part 310B (Assembly 9, P4), and part 312A (Assembly 5, P3) can swap with part 312B (Assembly 6, P3).

Figure 3B:
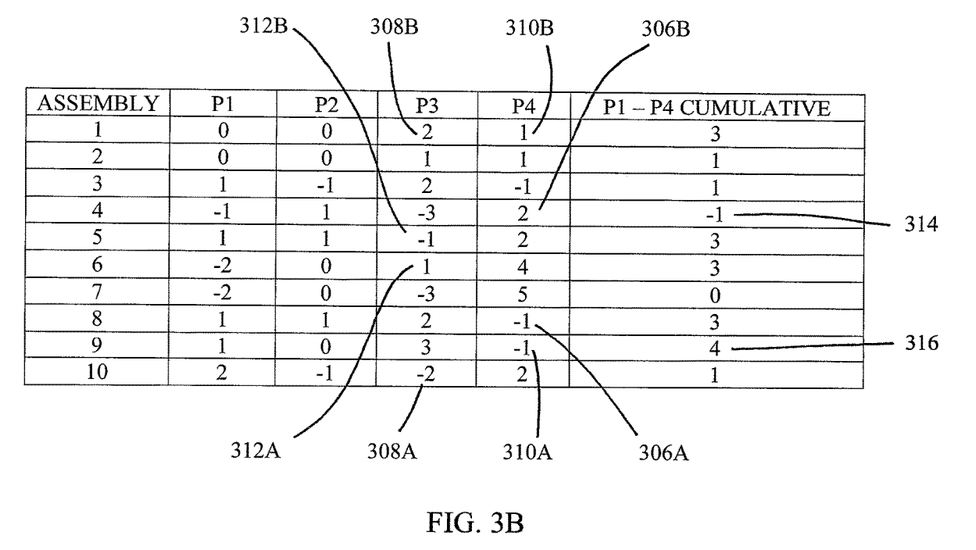
FIG. 3B is an example of an altered selection of parts with a single Part Attribute (PA), in accordance with an embodiment of the present invention.

FIG. 3B is an example of an altered selection of parts with a single Part Attribute (PA), in accordance with an embodiment of the present invention.

Subsequent to the swap, part 306A is located at (Assembly 8, P4), part 306B is located at (Assembly 4, P4), part 308A is located at (Assembly 10, P3), part 308B is located at (Assembly 1, P3), part 310A is located at (Assembly 9, P4), part 310B is located at (Assembly 1, P4), part 312A is located at (Assembly 6, P3), and part 312B is located at (Assembly 5, P3). As a result, minimum value 314 is now −1 mil and maximum value 316 is 4, across all 10 units. For minimum value 314, there is a 75% improvement in negative tolerance when compared to the negative tolerance prior to the swap occurring. For maximum value 316, there is a 33% improvement in positive tolerance when compared to the positive tolerance prior to the swap. Part performance matching program 110 allows for the swapping of parts prior to the physical assembly occurring and part performance matching program 110 can consider multiple Part Attributes across a large amount of part numbers.

Figure 4:
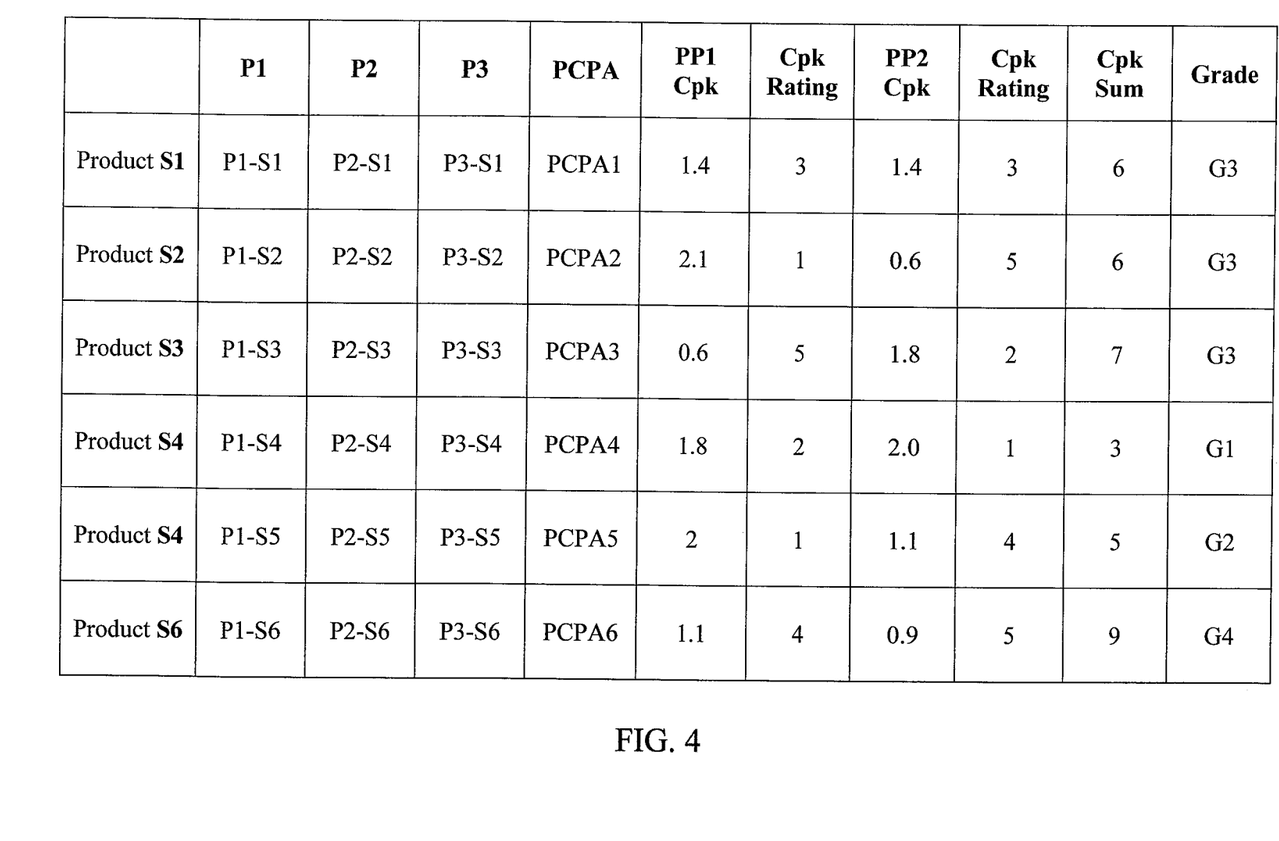
FIG. 4 is an example of a product cluster template for a Real-time Parts Performance Matching (RPPM) engine of a part performance matching program, in accordance with an embodiment of the present invention.

FIG. 4 is an example of a product cluster template for a Real-time Parts Performance Matching (RPPM) engine of a part performance matching program, in accordance with an embodiment of the present invention.

In this example, part performance matching program 110 receives training data for specific set of assemblies, where there are 100 products in the training data. Each of the 100 products are assembled utilizing 3 parts (P1, P2, and P3). Part performance matching program 110 analyzes the training data for the specific set of assemblies and creates 6 total part clusters across the 3 parts (P1, P2, and P3). Part performance matching program 110 identifies 3 clusters for part P1 (C1=3), 2 clusters for part P2 (C2=2), and 1 cluster for part P3 (C3=1). As a result, part performance matching program 110 determines there are a maximum of 6 (C1*C2*C3) Product Cluster by Part Attribute (PCPA1-PCPA6) for all the parts. Part performance matching program 110 selects a single product for each PCPA (Product S1-Product S6), assuming all 100 products in the training data include all 6 combinations. For Product S1-Product S6, there is a total of 18 physical parts with 6 physical parts under each of P1, P2, and P3. Each of the 18 physical parts are denoted as Px-Sx where for example, part P1 for Product S4 is denoted as P1-S4.

In this example, each of the 6 products (S1-S6) include 2 separate Product Performance Indicators (PPI1 and PPI2) and Product Performance Indicator ratings. The Product Performance Indicator is a measure of process capability $C_{pk}$ for specifications that consist of only a lower limit (e.g., strength) and an upper limit (e.g., concentration). Product Performance Indicators (PPI1) represents the measure of process capability $C_{pk}$ on the lower limit, assuming process output is approximately normally distributed. Product Performance Indicators (PPI2) represents the measure of process capability $C_{pk}$ on the upper limit, assuming process output is approximately normally distributed.

Part performance matching program 110 utilizes a user defined rating system where, $C_{pk}$ rating=2 if $C_{pk}>=2$, $C_{pk}$ rating=2 if $2>C_{pk}>=1.66$, $C_{pk}$ rating=3 if $1.66>C_{pk}>=1.33$, $C_{pk}$ rating=4 if $1.33>C_{pk}>=1$, and $C_{pk}$ rating=5 if $1>C_{pk}$. For each $C_{pk}$ rating sum across multiple Product Performance Indicators, part performance matching program 110 assigns a final grade based on the sum of $C_{pk}$ ratings across PPI1 and PPI2. For example, Grade G1=$C_{pk}$ sum is either 2 or 3, Grade G2=$C_{pk}$ sum is either 4 and 5, Grade G3=$C_{pk}$ sum is either 6 or 7, and Grade G4=$C_{pk}$ sum is either 8, 9, or 10. In this example, PCPA4 has the highest-grade assembly with Grade G1 since the sum of the two Product Performance Indicator Ratings is the lowest with 3. PCPA5 has a Grade G2, PCPA1, PCPA2, PCPA3 have a Grade G3, and PCPA6 has a grade of G4. The table of the 6 Product Cluster by Part Attribute is a visual representation of a product cluster template for which an RPPM engine of part performance matching program 110 utilizes. Part performance matching program 110 utilizes this template to optimize the part selection when receiving a set of production parts information for unassembled products. Part performance matching program 110 identifies the highest-grade assembly possible (i.e., PCPA4) based on the product cluster template and creates a production data set, where various parts are clustered with one another.

Figure 5:
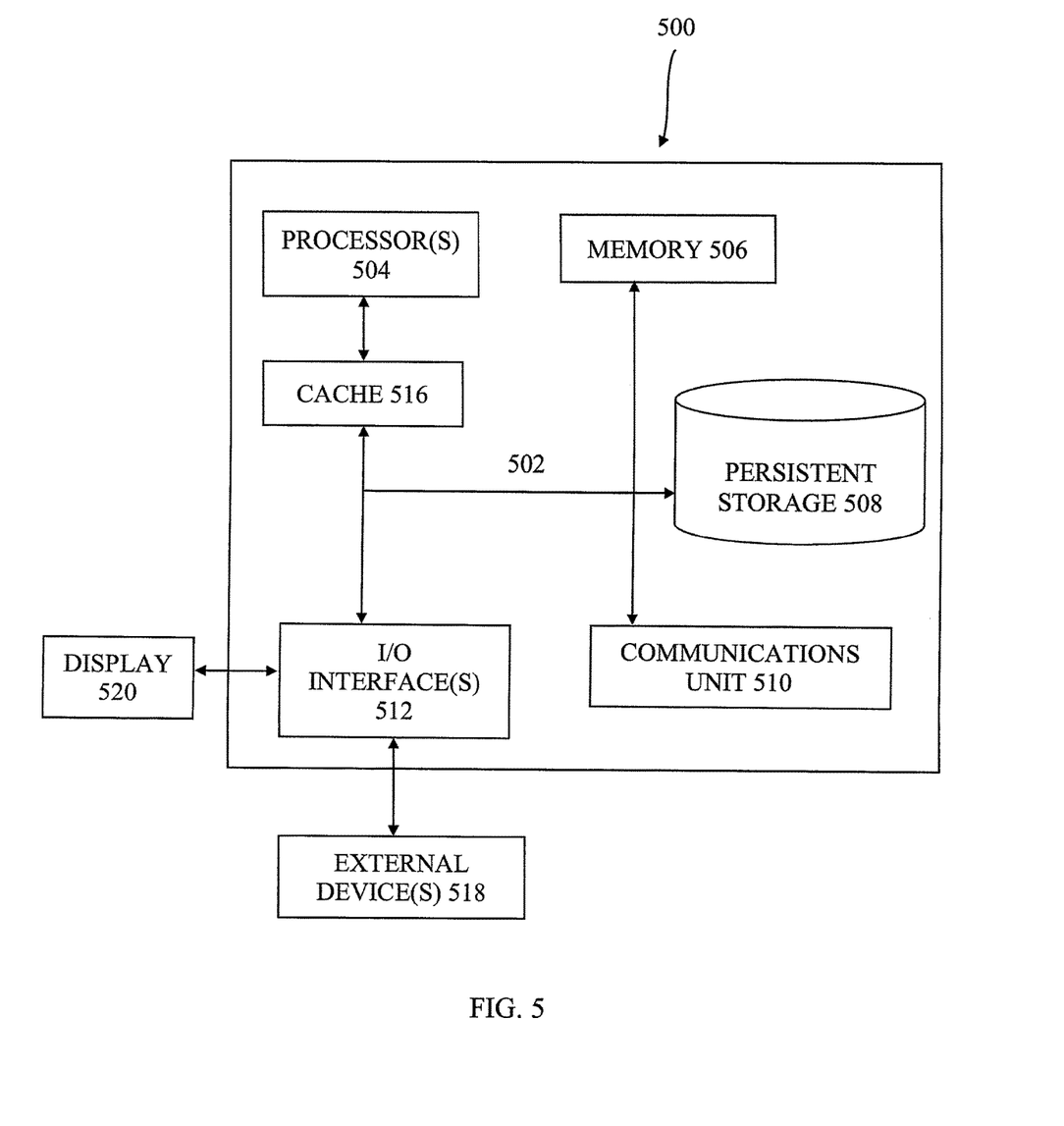
FIG. 5 is a block diagram of components of a computer system, such as the server computer of FIG. 1, in accordance with an embodiment of the present invention.

FIG. 5 depicts computer system 500, where server computer 102 is an example of a system that includes parts performance matching program 110. The computer system includes processors 504, cache 516, memory 506, persistent storage 508, communications unit 510, input/output (I/O) interface(s) 512 and communications fabric 502. Communications fabric 502 provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 502 includes random access memory (RAM). In general, memory 506 can include any suitable volatile or non-volatile computer readable storage media. Cache 516 is a fast memory that enhances the performance of processors 504 by holding recently accessed data, and data near recently accessed data, from memory 506.

Program instructions and data used to practice embodiments of the present invention may be stored in persistent storage 508 and in memory 506 for execution by one or more of the respective processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Program instructions and data used to practice embodiments of the present invention may be downloaded to persistent storage 508 through communications unit 510.

I/O interface(s) 512 allows for input and output of data with other devices that may be connected to each computer system. For example, I/O interface 506 may provide a connection to external devices 518 such as a keyboard, keypad, a touch screen, and/or some other suitable input device. External devices 518 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 also connect to display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A method comprising:
receiving, by one or more processors, a training data set for a first plurality of assemblies, wherein the training data set includes a first plurality of components for each of two or more types of components of the first plurality of assemblies;
analyzing, by one or more processors, the training data set for the first plurality of assemblies, wherein analyzing the training data set for the first plurality of assemblies comprises:
identifying, by one or more processors, a product performance indicator for each of the first plurality of assemblies,
identifying, by one or more processors, a part attribute for each of the first plurality of components,
creating, by one or more processors, two or more clusters for the first plurality of components based on the identified part attribute for each of the first plurality of components and the two or more types of components, and
assigning, by one or more processors, a grade to each of the two or more clusters, wherein the grade is based on a sample product performance indicator for a sample assembly out of the plurality of assembly;

responsive to receiving a set of product component information for a second plurality of assemblies, creating, by one or more processors, a graded product cluster template for the second plurality of assemblies based on the analyzed training data for the first plurality of assemblies; and send, by one or more processors, the graded product cluster template to an automated manufacturing device, wherein the automated manufacturing device manufactures a first assembly from the second plurality of assemblies based on the graded product cluster template.

2. The method of claim 1, further comprising:

creating, by one or more processors, a component processing engine for creating the graded product cluster template set based on the training data set for the plurality of assemblies and the assigned grade to each of the two or more clusters.

3. The method of claim 2, further comprising:

updating, by one or more processors, the component processing engine based on both the training data set for the first plurality of assemblies and the production data set for the second plurality of assemblies.

4. The method of claim 3, wherein creating a graded product cluster template for the second plurality of assemblies, further comprises:

identifying, by one or more processors, the two or more types of components for the second plurality of assemblies with a second plurality of components for each of the two or more types of component;

responsive to selecting a first grade out of the grades for each of the two or more clusters, assigning, by one or more processors, the second plurality of components based on a cluster associated with the first grade.

5. The method of claim 1, where the graded product cluster template includes assignments for a second plurality of components for the manufacturing of a second plurality of assemblies.

6. The method of claim 1, wherein send the graded product cluster template to an automated manufacturing device further comprises:

instructing, by one or more processors, the automated manufacturing device to select a specific component for a specific assembly out of the second plurality of assemblies.

7. A computer program product comprising:

one or more computer readable storage media and program instructions stored on at least one of the one or more storage media, the program instructions comprising:

program instructions to receive a training data set for a first plurality of assemblies, wherein the training data set includes a first plurality of components for each of two or more types of components of the first plurality of assemblies;

program instructions to analyze the training data set for the first plurality of assemblies, wherein the program instructions to analyze the training data set for the first plurality of assemblies comprises:

program instructions to identify a product performance indicator for each of the first plurality of assemblies, program instructions to identify a part attribute for each of the first plurality of components, program instructions to create two or more clusters for the first plurality of components based on the identified part attribute for each of the first plurality of components and the two or more types of components, and program instructions to assign a grade to each of the two or more clusters, wherein the grade is based on a sample product performance indicator for a sample assembly out of the plurality of assembly;

program instructions to, responsive to receiving a set of product component information for a second plurality of assemblies, create a graded product cluster template for the second plurality of assemblies based on the analyzed training data for the first plurality of assemblies; and program instructions to send the graded product cluster template to an automated manufacturing device, wherein the automated manufacturing device manufactures a first assembly from the second plurality of assemblies based on the graded product cluster template.

8. The computer program product of claim 7, further comprises program instructions, stored on the one or more computer readable storage media, which when executed by a processor, cause the processor to:

create a component processing engine for creating the graded product cluster template set based on the training data set for the plurality of assemblies and the assigned grade to each of the two or more clusters.

9. The computer program product of claim 8, further comprising program instructions, stored on the one or more computer readable storage media, which when executed by a processor, cause the processor to:

update the component processing engine based on both the training data set for the first plurality of assemblies and the production data set from the second plurality of assemblies.

10. The computer program product of claim 9, wherein creating a graded product cluster template for the second plurality of assemblies, further comprises program instructions, stored on the one or more computer readable storage media, which when executed by a processor, cause the processor to:

identify the two or more types of components for the second plurality of assemblies with a second plurality of components for each of the two or more types of component;

responsive to selecting a first grade out of the grades for each of the two or more clusters, assign the second plurality of components based on a cluster associated with the first grade.

11. The computer program product of claim 7, where the graded product cluster template includes assignments for a second plurality of components for the manufacturing of a second plurality of assemblies.

12. The computer program product of claim 7, wherein send the graded product cluster template to an automated manufacturing device further comprises program instructions, stored on the one or more computer readable storage media, which when executed by a processor, cause the processor to:

instruct the automated manufacturing device to select a specific component for a specific assembly out of the second plurality of assemblies.

13. A computer system comprising:

one or more computer processors;

one or more computer readable storage media; and program instructions stored on the computer readable storage media for execution by at least one of the one or more computer processors, the program instructions comprising:

program instructions to receive a training data set for a first plurality of assemblies, wherein the training data set includes a first plurality of components for each of two or more types of components of the first plurality of assemblies;

program instructions to analyze the training data set for the first plurality of assemblies, wherein the program instructions to analyze the training data set for the first plurality of assemblies comprises:

program instructions to identify a product performance indicator for each of the first plurality of assemblies,     program instructions to identify a part attribute for each of the first plurality of components,     program instructions to create two or more clusters for the first plurality of components based on the identified part attribute for each of the first plurality of components and the two or more types of components, and     program instructions to assign a grade to each of the two or more clusters, wherein the grade is based on a sample product performance indicator for a sample assembly out of the plurality of assembly;

program instructions to, responsive to receiving a set of product component information for a second plurality of assemblies, create a graded product cluster template for the second plurality of assemblies based on the analyzed training data for the first plurality of assemblies; and program instructions to send the graded product cluster template to an automated manufacturing device, wherein the automated manufacturing device manufactures a first assembly from the second plurality of assemblies based on the graded product cluster template.

14. The computer system of claim 13, further comprises program instructions, stored on the one or more computer readable storage media, which when executed by a processor, cause the processor to:

create a component processing engine for creating the graded product cluster template based on the training data set for the first plurality of assemblies and the assigned grade to each of the two or more clusters.

15. The computer system of claim 14, further comprising program instructions, stored on the one or more computer readable storage media, which when executed by a processor, cause the processor to:

update the component processing engine based on both the training data set for the first plurality of assemblies and the production data set from the second plurality of assemblies.

16. The computer system of claim 15, wherein creating a graded product cluster template for the second plurality of assemblies, further comprises program instructions, stored on the one or more computer readable storage media, which when executed by a processor, cause the processor to:

identify the two or more types of components for the second plurality of assemblies with a second plurality of components for each of the two or more types of component;

responsive to selecting a first grade out of the grades for each of the two or more clusters, assign the second plurality of components based on a cluster associated with the first grade.

17. The computer program product of claim 13, where the graded product cluster template includes assignments for a second plurality of components for the manufacturing of a second plurality of assemblies.

* * * * *